L. M. WITT & C. K. & E. F. STOLBA.
GARDEN IMPLEMENT.
APPLICATION FILED JULY 29, 1915.
1,177,840.
Patented Apr. 4, 1916.
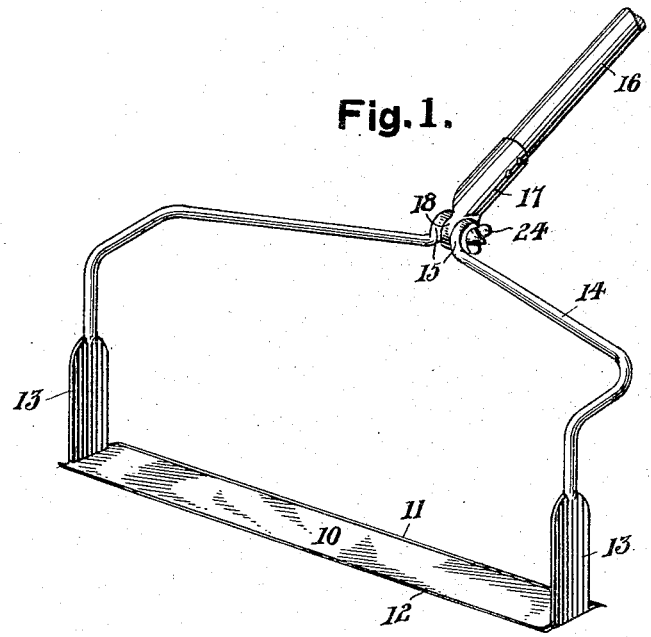
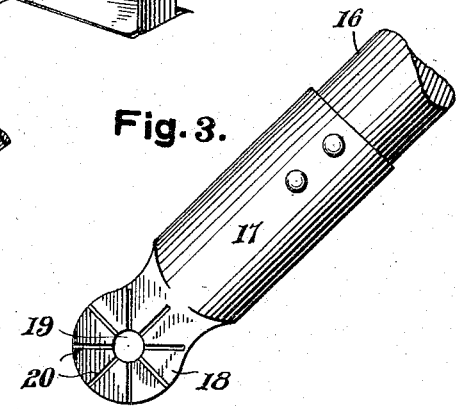
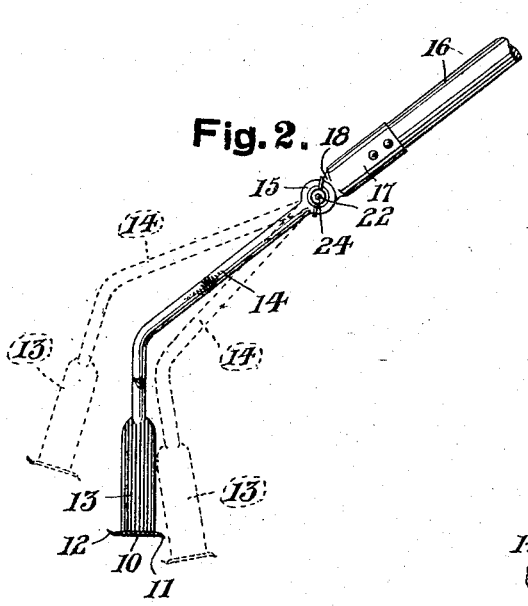
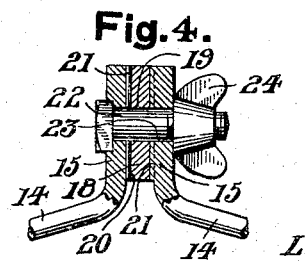
Inventors
L. M. Witt
C. K. Stolba
E. F. Stolba
By A. M. Wilson,
Attorney

UNITED STATES PATENT OFFICE.

LADDIE M. WITT, CHARLES K. STOLBA, AND EDWARD F. STOLBA, OF CEDAR RAPIDS, IOWA.

GARDEN IMPLEMENT.

1,177,840. Specification of Letters Patent. Patented Apr. 4, 1916.

Application filed July 29, 1915. Serial No. 42,543.

*To all whom it may concern:*

Be it known that we, LADDIE M. WITT, CHARLES K. STOLBA, and EDWARD F. STOLBA, citizens of the United States, residing at Cedar Rapids, in the county of Linn and State of Iowa, have invented certain new and useful Improvements in Garden Implements, of which the following is a specification.

This invention relates to certain new and useful improvements in garden implements.

The primary object of the invention is the provision of a handy garden implement that is easy and inexpensive to manufacture and which is serviceable in hoeing, cutting and weeding and in general work such as hilling and cultivating in connection with both flowers and vegetables.

A further object of the invention is the provision of a weed cutter having an adjustable operating handle and being operable by moving its elongated operating blade in either direction during the cutting operation.

With these general objects in view and others that will appear as the nature of the invention is better understood, the same consists in the novel combination and arrangement of parts hereinafter more fully described, illustrated in the accompanying drawings and pointed out in the appended claim.

In the drawings forming a part of this application and in which like designating characters refer to corresponding parts throughout the several views, Figure 1 is a perspective view of the device the handle thereof being broken away. Fig. 2 is a side elevation thereof with one of the side members broken away and the blade shown in transverse section. Fig. 3 is a side elevation of the clamping end of the operating handle, and Fig. 4 is a central sectional view through the handle clamp.

Referring more in detail to the drawings, it will be noted that an elongated blade 10 is provided in the form of a strip of metal having its opposite parallel edges 11 and 12 sharpened for forming cutting members and being respectively downturned and upturned,—the edge 11 being designated as the forward edge and the edge 12 as the rear edge of the device.

The metal forming the blade 10 is contracted and bent upon itself in perpendicular relations at the opposite ends of the blade forming brackets 13, the free ends of which brackets are formed into angularly bent supporting arms 14 terminating in oppositely arranged spaced perforated ears 15.

An operating handle 16 is provided for the device having a ferrule 17 at one end thereof which terminates in a disk 18 provided with a central opening 19 therethrough, while radially arranged grooves 20 are provided upon the opposite faces of the said disk. The ears 15 are provided with radially arranged ribs 21 upon their inner faces which ribs are adapted to register with and enter into the disk grooves 20, when the handle is positioned with the said disk 18 arranged between the ears 15 and with the said ears and disk connected together by means of a bolt 22 extending through the disk opening 19 and through the central perforations 23 of the said ears.

From this detailed description of the invention, it will be evident that by releasing the winged nut 24 upon the bolt 22 that the handle 16 may be adjusted at the desired angle with respect to the blade 10 and may then be retained in its adjusted position by tightening the nut 24 and securing the ribs 21 of the ears within the grooves 20 of the said disk. Different adjustments of the operating blade 10 are illustrated by dotted lines in Fig. 2 of the drawings, while the cross-sectional formation of the blade is also therein illustrated.

It will be seen that by drawing the implement forwardly by means of the handle 16, that the forward edge 11 which dips downwardly may be drawn slightly into the earth for cutting the roots of the wheels and may be readily positioned to so cut to the desired depth, while a backward thrust of the implement allows the rear edge 12 to cut any weeds and limbs or desired objects which are positioned at the surface of the ground when the blade 10 is flatly impelled thereover. The two cutting edges 11 and 12 may be also employed for cutting twigs and branches as well as weeds and flowers when desired and upon the proper adjustment of the handle 16.

While the form of the invention herein shown and described is what is believed to be the preferred embodiment thereof, it is nevertheless to be understood that minor changes may be made therein without departing from the spirit and scope of the invention as set forth in the claim.

What we claim as new is:—

An implement comprising a thin cutting blade having a downwardly curved forward sharpened edge and an upturned sharpened rear edge, the said blade terminating in angularly arranged contracted brackets, which brackets terminate in curved rearwardly extending supporting arms having spaced ears, an operating handle, and angle adjusting connecting means between the said handle and the said ears.

In testimony whereof we affix our signatures in presence of two witnesses.

LADDIE M. WITT.
CHARLES K. STOLBA.
EDWARD F. STOLBA.

Witnesses:
E. K. DEIHL,
FRANK O. MEKATO.

Copies of this patent may be obtained for five cents each, by addressing the "Commissioner of Patents, Washington, D. C."